(12) United States Patent
Kumar

(10) Patent No.: US 11,588,600 B2
(45) Date of Patent: Feb. 21, 2023

(54) ANTENNA SELECTION FOR SOUNDING REFERENCE SIGNAL ANTENNA SWITCHING

(71) Applicant: QUALCOMM Incorporated, San Diego, CA (US)

(72) Inventor: Akash Kumar, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/248,437

(22) Filed: Jan. 25, 2021

(65) Prior Publication Data
US 2022/0239420 A1 Jul. 28, 2022

(51) Int. Cl.
| H04L 5/00 | (2006.01) |
| H04B 7/0404 | (2017.01) |
| H04W 72/02 | (2009.01) |
| H04W 72/044 | (2023.01) |
| H04W 72/1273 | (2023.01) |

(52) U.S. Cl.
CPC ........... *H04L 5/005* (2013.01); *H04B 7/0404* (2013.01); *H04W 72/02* (2013.01); *H04W 72/044* (2013.01); *H04W 72/1273* (2013.01)

(58) Field of Classification Search
None
See application file for complete search history.

(56) References Cited

U.S. PATENT DOCUMENTS

| 2015/0016239 A1* | 1/2015 | Yi | H04J 11/003 370/201 |
| 2015/0056933 A1 | 2/2015 | Yan et al. | |
| 2015/0201383 A1 | 7/2015 | Papasakellariou et al. | |
| 2016/0018509 A1* | 1/2016 | McCorkle | G01S 3/146 342/386 |
| 2016/0135195 A1* | 5/2016 | Dong | H04W 76/27 370/329 |

(Continued)

FOREIGN PATENT DOCUMENTS

| WO | WO-2021173223 A1 | 9/2021 |
| WO | WO-2021252175 A1 | 12/2021 |

OTHER PUBLICATIONS

AT&T: "Further Details and Techniques on LTE and NR Co-Existence", 3GPP Draft, 3GPP TSG RAN1 NR Ad Hoc Meeting, R1-1700327, LTE NR Co-Existence, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16-Jan. 20, 2016, Jan. 10, 2017 (Jan. 10, 2017), XP051202805, 5 Pages, Retrieved from the Internet: URL: http://www.3gpp.org/ftp/tsg_ran/WG1-RL1/TSGR1-AH/NR-AH-1701/Docs/. [Retrieved on Jan. 10, 2017], The Whole Document.

(Continued)

*Primary Examiner* — Phirin Sam
(74) *Attorney, Agent, or Firm* — Holland & Hart LLP

(57) ABSTRACT

Various aspects of the present disclosure generally relate to wireless communication. In some aspects, a user equipment (UE) may select an antenna for transmitting a New Radio sounding reference signal (SRS) such that antenna resource conflicts with receiving an LTE cell-specific reference signal are minimized based at least in part on an antenna resource configuration. The UE may transmit the SRS on the selected antenna. Numerous other aspects are described.

20 Claims, 11 Drawing Sheets

(56) References Cited

U.S. PATENT DOCUMENTS

| | | | | |
|---|---|---|---|---|
| 2018/0278312 | A1* | 9/2018 | Frenne | H04L 5/0048 |
| 2019/0174527 | A1* | 6/2019 | Park | H04L 5/0051 |
| 2019/0342768 | A1* | 11/2019 | Xu | H04B 7/0639 |
| 2019/0357264 | A1* | 11/2019 | Yi | H04L 5/001 |
| 2020/0163095 | A1 | 5/2020 | Kim et al. | |
| 2020/0178092 | A1* | 6/2020 | Ren | H04B 7/0404 |
| 2020/0396035 | A1* | 12/2020 | Yu | H04L 5/0023 |
| 2021/0083825 | A1* | 3/2021 | Choi | H04L 1/06 |
| 2021/0167837 | A1* | 6/2021 | Großman | H04L 1/1614 |
| 2021/0289583 | A1* | 9/2021 | Zhang | H04W 76/28 |
| 2022/0123857 | A1* | 4/2022 | Zhang | H04W 76/16 |

OTHER PUBLICATIONS

International Search Report and Written Opinion—PCT/US2021/072828—ISA/EPO—Jul. 26, 2022.

Partial International Search Report—PCT/US2021/072828—ISA/EPO—May 9, 2022.

Qualcomm Incorporated: "NR-LTE Co-Channel Coexistence Considerations", 3GPP TSG-RAN WG1 NR#2, R1-1711229, 3rd Generation Partnership Project, Mobile Competence Centre, 650, Route Des Lucioles, F-06921, Sophia-Antipolis Cedex, France, vol. RAN WG1, No. Qingdao, P. R. China, Jun. 27-Jun. 30, 2017, Jun. 26, 2017, XP051300428, pp. 1-5.

Vodafone Group PLC, et al., "Uplink Operation for LTE+NR Dual Connectivity", R1-1701198, 3GPP TSG RAN WG1 NR AH Meeting, 3rd Generation Partnership Project, Mobile Competence Centre, 650, Route Des Lucioles, F-06921, Sophia-Antipolis Cedex, France, vol. RAN WG1, No. Spokane, USA, Jan. 16-Jan. 20, 2017, Jan. 17, 2017, XP051222235, 4 Pages.

\* cited by examiner

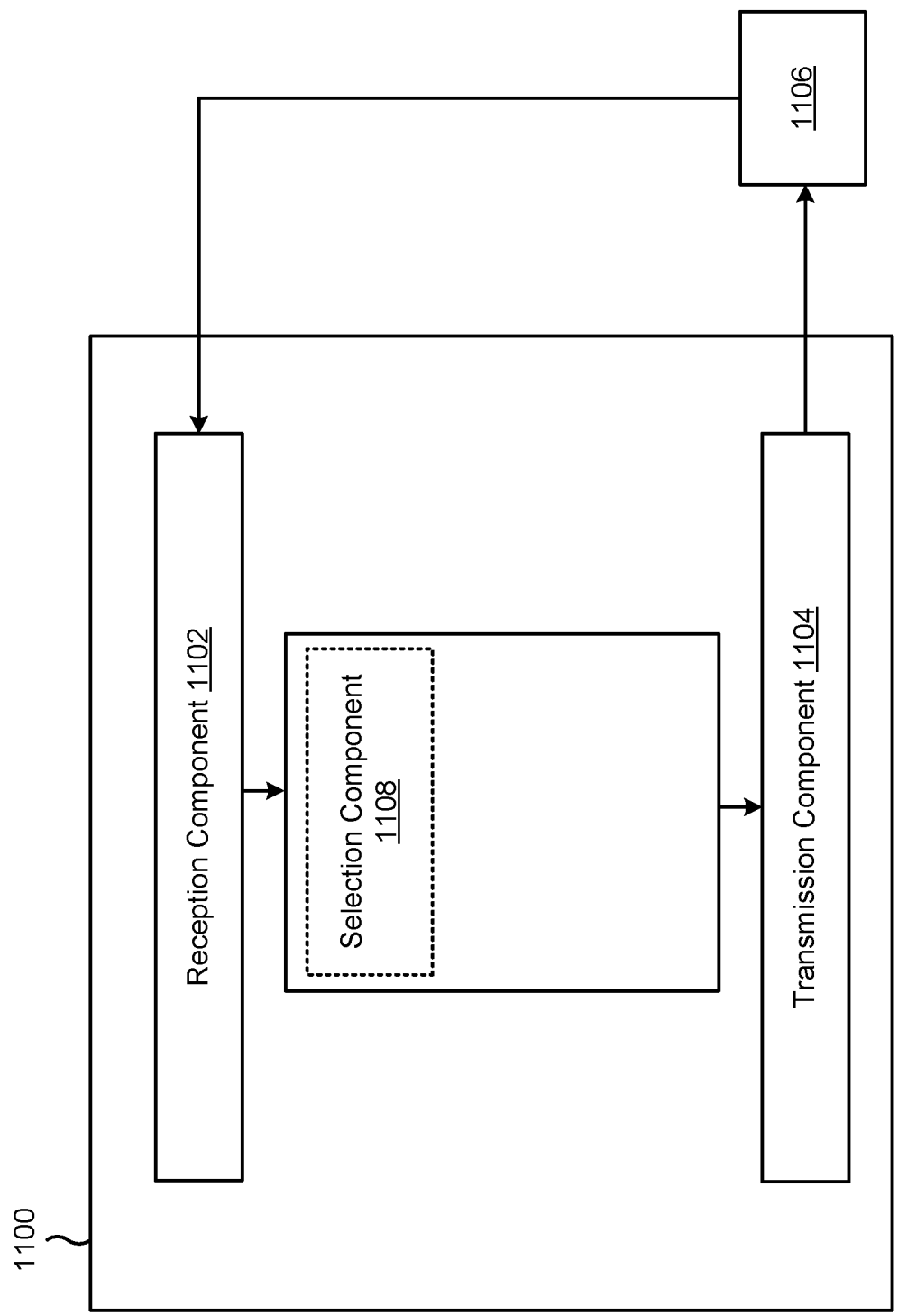

ANTENNA SELECTION FOR SOUNDING REFERENCE SIGNAL ANTENNA SWITCHING

FIELD OF THE DISCLOSURE

Aspects of the present disclosure generally relate to wireless communication and to techniques and apparatuses for selecting antennas for sounding reference signal antenna switching.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long-Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes selecting an antenna for transmitting a New Radio (NR) sounding reference signal (SRS) such that antenna resource conflicts with receiving a Long Term Evolution (LTE) cell-specific reference signal (CRS) are minimized based at least in part on an antenna resource configuration, and transmitting the SRS on the selected antenna.

In some aspects, a method of wireless communication performed by a UE includes selecting an antenna for receiving an LTE communication on a physical downlink shared channel (PDSCH) according to a periodic rotation of antennas specified in an antenna resource configuration that involves NR SRS transmission, and receiving the LTE communication on the PDSCH on the selected antenna.

In some aspects, a UE for wireless communication includes a memory and one or more processors operatively coupled to the memory, the memory and the one or more processors configured to select an antenna for transmitting an NR SRS such that antenna resource conflicts with receiving an LTE CRS are minimized based at least in part on an antenna resource configuration, and transmit the SRS on the selected antenna.

In some aspects, a UE for wireless communication includes a memory and one or more processors operatively coupled to the memory, the memory and the one or more processors configured to select an antenna for receiving an LTE communication on a PDSCH according to a periodic rotation of antennas specified in an antenna resource configuration that involves NR SRS transmission, and receive the LTE communication on the PDSCH on the selected antenna.

In some aspects, a non-transitory computer-readable medium storing a set of instructions for wireless communication includes one or more instructions that, when executed by one or more processors of a UE, cause the UE to select an antenna for transmitting an NR SRS such that antenna resource conflicts with receiving an LTE CRS are minimized based at least in part on an antenna resource configuration, and transmit the SRS on the selected antenna.

In some aspects, a non-transitory computer-readable medium storing a set of instructions for wireless communication includes one or more instructions that, when executed by one or more processors of a UE, cause the UE to select an antenna for receiving an LTE communication on a PDSCH according to a periodic rotation of antennas specified in an antenna resource configuration that involves NR SRS transmission, and receive the LTE communication on the PDSCH on the selected antenna.

In some aspects, an apparatus for wireless communication includes means for selecting an antenna for transmitting an NR SRS such that antenna resource conflicts with receiving an LTE CRS are minimized based at least in part on an antenna resource configuration, and means for transmitting the SRS on the selected antenna.

In some aspects, an apparatus for wireless communication includes means for selecting an antenna for receiving an LTE communication on a PDSCH according to a periodic rotation of antennas specified in an antenna resource configuration that involves NR SRS transmission, and means for receiving the LTE communication on the PDSCH on the selected antenna.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 10-11 are block diagrams of an example apparatus for wireless communication, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
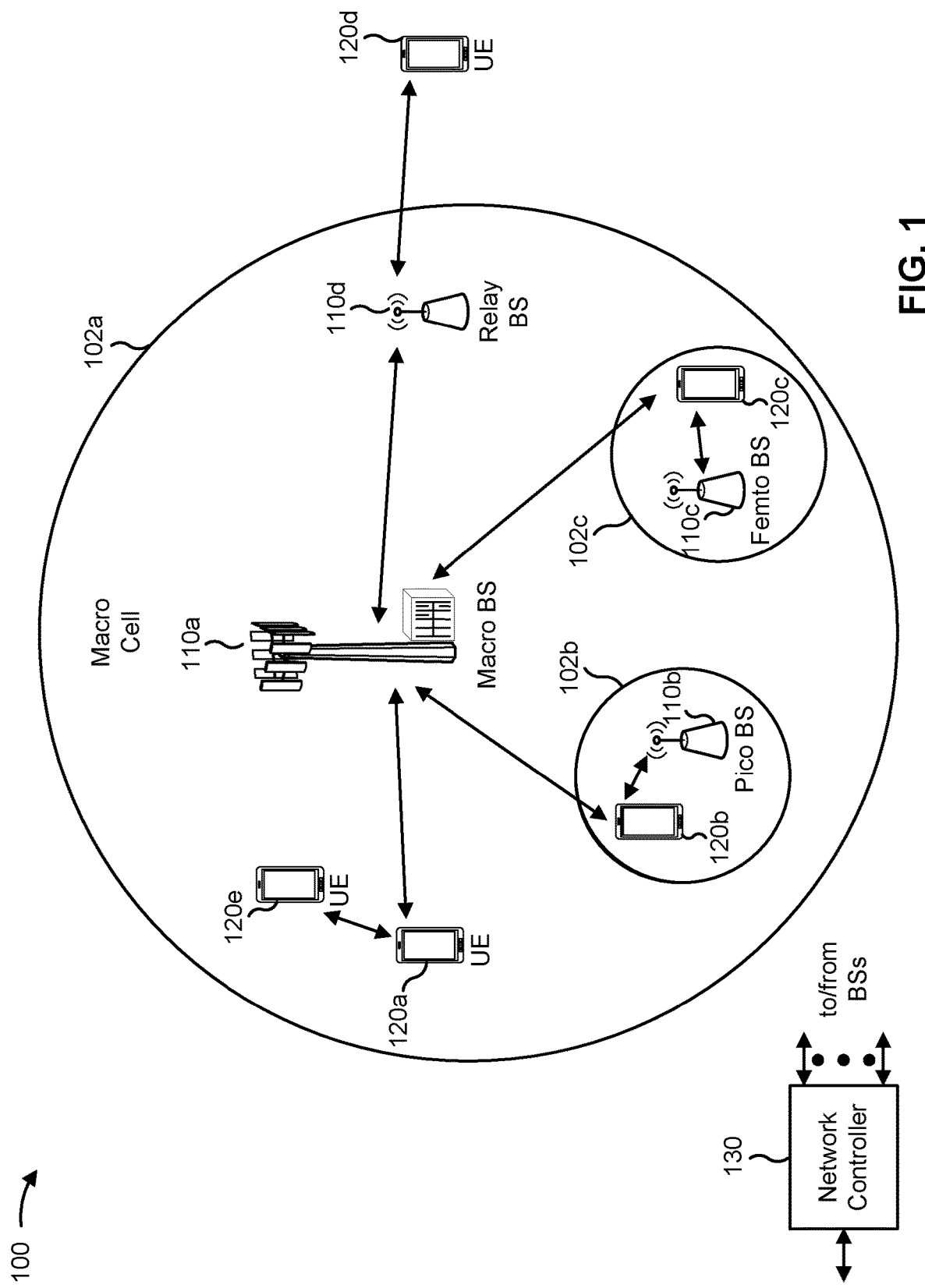
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
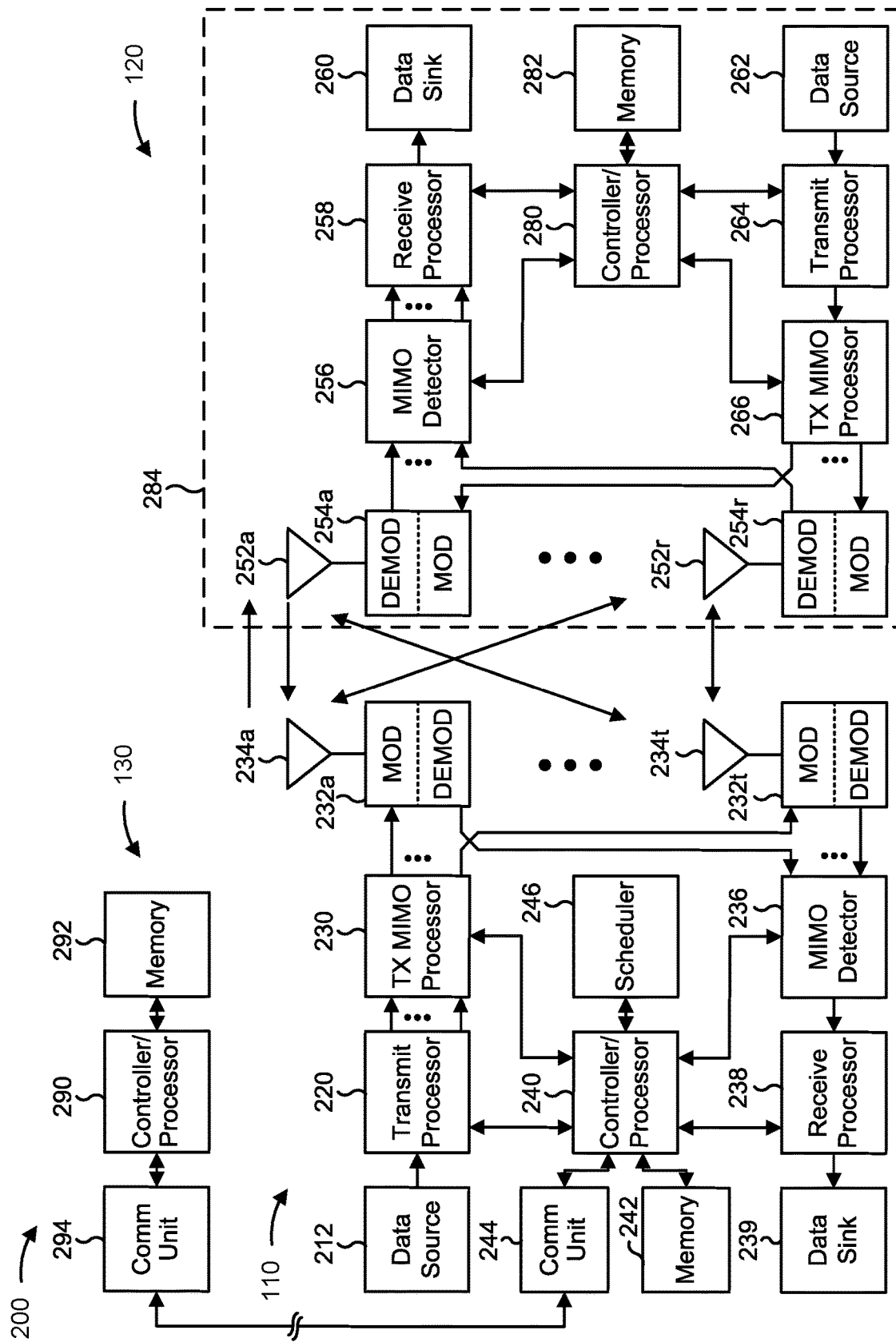
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with selecting antennas for sounding reference signal (SRS) antenna switching, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions.

In some aspects, UE 120 includes means for selecting an antenna for transmitting an NR SRS such that antenna resource conflicts with receiving an LTE cell-specific reference signal (CRS) are minimized based at least in part on an antenna resource configuration, and/or means for transmitting the SRS on the selected antenna. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for selecting an antenna for receiving an LTE communication on a PDSCH according to a periodic rotation of antennas specified in an antenna resource configuration that involves NR SRS transmission, and/or means for receiving the LTE communication on the PDSCH on the selected antenna. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for mapping layers to antennas such that antennas that conflict with receiving the LTE communication on the PDSCH do not belong to a same layer.

As indicated above, FIG. 2 is provided as an example. Other examples may differ from what is described with regard to FIG. 2.

Figure 3:
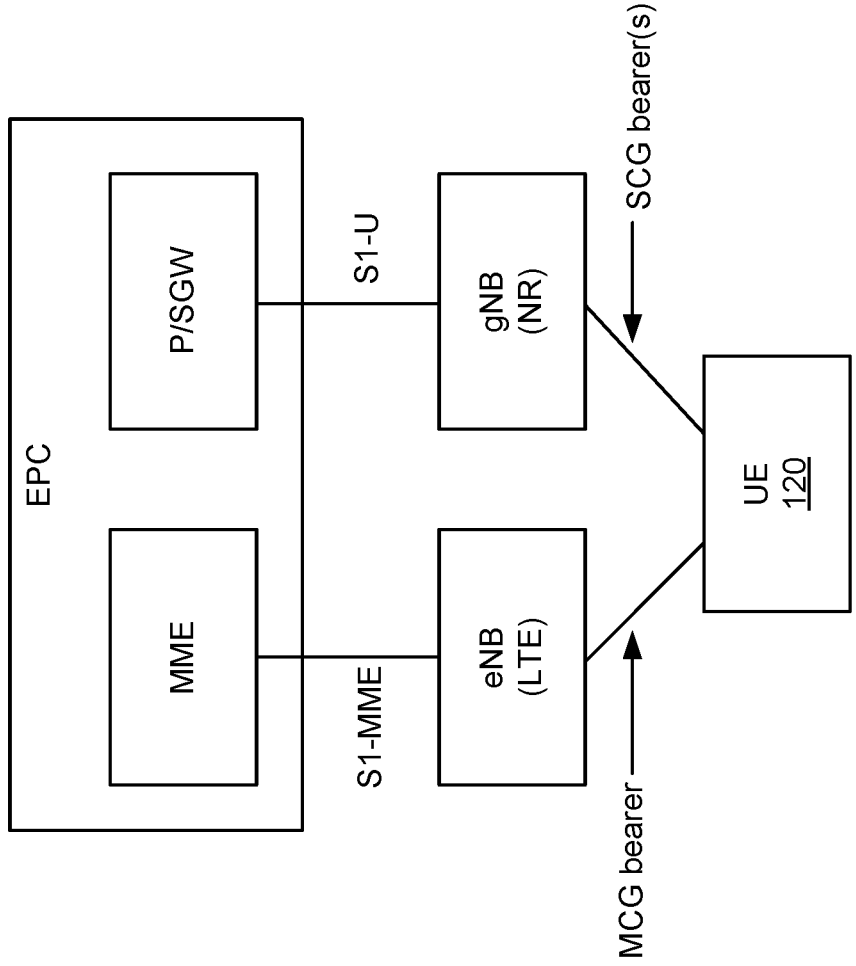
FIG. 3 is a diagram illustrating an example of dual connectivity, in accordance with various aspects of the present disclosure.

FIG. 3 is a diagram illustrating an example 300 of dual connectivity, in accordance with various aspects of the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-U IRA dual connectivity (NEDC) mode (e.g., where the MCG is associated with an NR RAT and the SCG is associated with an LTE RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, UE 120 may communicate with the eNB via the MCG, and may communicate with the gNB via the SCG. In some aspects, the MCG may anchor a network connection between UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT. In some aspects, the MCG may be associated with a first frequency band (e.g., a sub-6 GHz band and/or an FR1 band) and the SCG may be associated with a second frequency band (e.g., a millimeter wave band and/or an FR2 band).

UE 120 may communicate via the MCG and the SCG using one or more radio bearers (e.g., data radio bearers (DRBs), signaling radio bearers (SRBs), and/or the like). For example, UE 120 may transmit or receive data via the MCG and/or the SCG using one or more DRBs. Similarly, UE 120 may transmit or receive control information (e.g., radio resource control (RRC) information, measurement reports, and/or the like) using one or more SRBs. In some aspects, a radio bearer may be dedicated to a specific cell group (e.g., a radio bearer may be an MCG bearer, an SCG bearer, and/or the like). In some aspects, a radio bearer may be a split radio bearer. A split radio bearer may be split in the uplink and/or in the downlink. For example, a DRB may be split on the downlink (e.g., UE 120 may receive downlink information for the MCG or the SCG in the DRB) but not on the uplink (e.g., the uplink may be non-split with a primary path to the MCG or the SCG, such that UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, UE 120 may transmit data to the MCG or the SCG using the DRB.

As indicated above, FIG. 3 is provided as an example. Other examples may differ from what is described with respect to FIG. 3.

Figure 4:
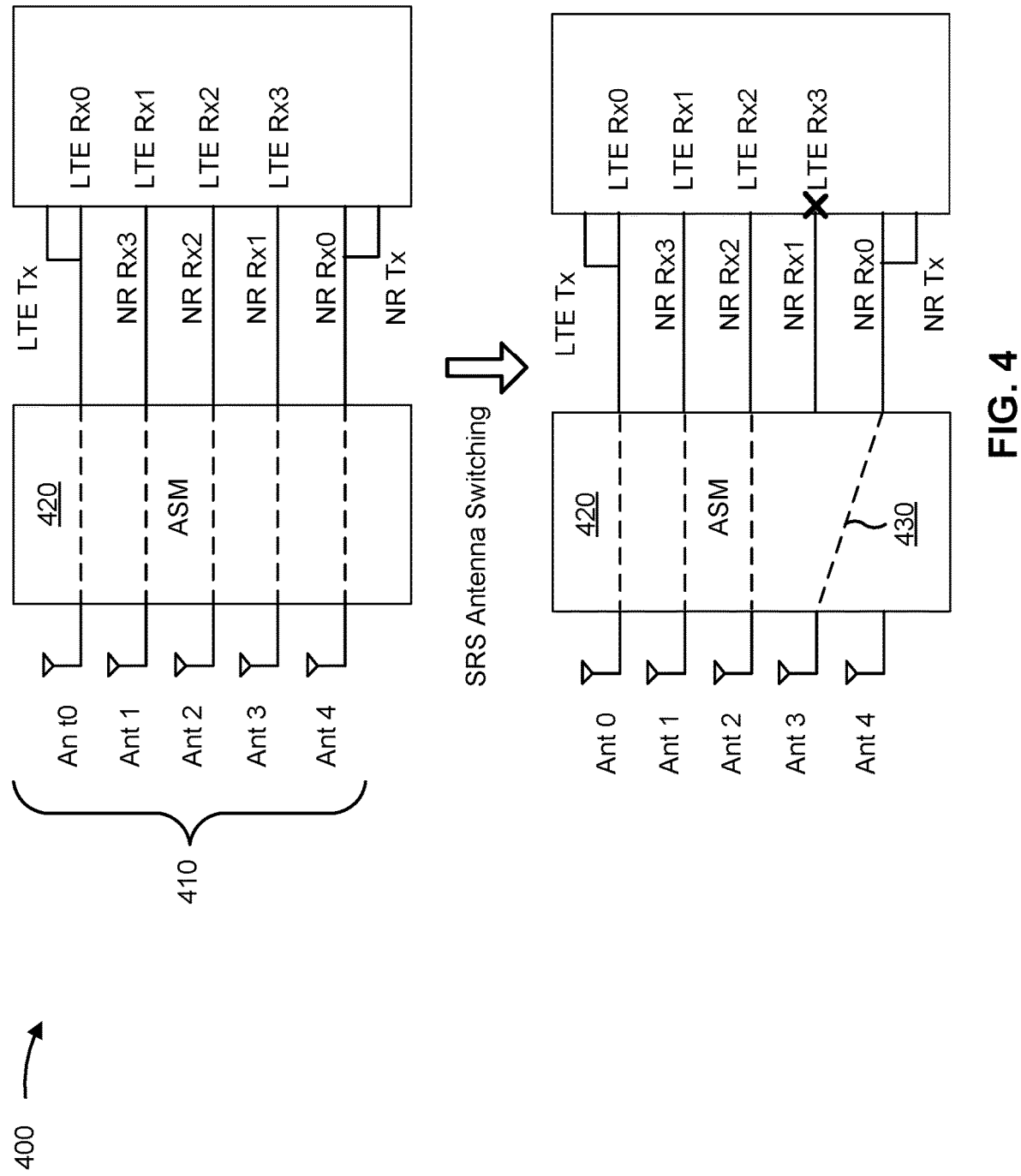
FIG. 4 is a diagram illustrating an example of antenna switching in a dual connectivity mode, in accordance with various aspects of the present disclosure.

FIG. 4 is a diagram illustrating an example 400 of antenna switching in a dual connectivity mode, in accordance with various aspects of the present disclosure. FIG. 4 shows an example of antenna switching for a UE 120 with five antennas (e.g., a first, second, third, fourth, and fifth antenna, shown as Ant 0, Ant 1, Ant 2, Ant 3, and Ant 4). In some examples, UE 120 may have a different number of antennas, such as four antennas. FIG. 4 also shows an example of antenna switching for transmission of an SRS. The SRS may carry information used for uplink channel estimation, which may be used for scheduling, link adaptation, precoder selection, or beam management, among other examples. An SRS resource (e.g., time domain resource, slot, symbol, resource block, periodicity, frequency domain resource) may be used to transmit the SRS. An SRS resource may also include one or more antenna ports on which an SRS is to be transmitted. A base station 110 may configure one or more SRS resource sets for UE 120, and UE 120 may transmit SRSs on the configured SRS resource sets. A configuration for an SRS resource set may indicate one or more time-frequency resources in which an SRS is to be transmitted and may indicate one or more antenna ports on which the SRS is to be transmitted in those time-frequency resources. An SRS resource set may have a configured usage, such as uplink channel state information (CSI) acquisition, downlink CSI acquisition for reciprocity-based operations, uplink beam management, among other examples. The base station may measure the SRSs, may perform channel estimation based at least in part on the measurements, and may use the SRS measurements to configure communications with the UE.

In some aspects, the techniques and apparatuses described herein may be applied when a UE 120 performs antenna switching for an operation other than SRS transmission. Furthermore, although FIG. 4 shows antenna switching in a dual connectivity mode associated with an LTE RAT (more generally, a first RAT) and an NR RAT (more generally, a second RAT), operations described herein apply to other combinations of the first RAT and the second RAT).

As shown by reference number 410, UE 120 may include multiple antennas (e.g., antennas 252, described above in connection with FIG. 2), shown as five antennas in example 400. An antenna may be used for transmission and/or reception of signals for one or more RATs. In example 400, Ant 0 is used for transmission on an LTE RAT (shown as LTE Tx) and reception on the LTE RAT (shown as LTE Rx0). In some aspects, the transmission and reception on Ant 0 are not concurrent or simultaneous. As further shown, Ant 1 is used for both reception on the LTE RAT (shown as LTE Rx1) and reception on the NR RAT (shown as NR Rx3), Ant 2 is used for both reception on the LTE RAT (shown as LTE Rx2) and reception on the NR RAT (shown as NR Rx2), and Ant 3 is used for both reception on the LTE RAT (shown as LTE Rx3) and reception on the NR RAT (shown as NR Rx1). In some aspects, reception on different RATs is not concurrent or simultaneous. As further shown, Ant 4 is used for transmission on the NR RAT (shown as NR Tx) and reception on the NR RAT (shown as NR Rx0). In some aspects, the transmission and reception on Ant 4 are not concurrent or simultaneous.

In a dual connectivity mode between the LTE RAT and the NR RAT, such as an ENDC mode, both the LTE RAT and the NR RAT are active at the same time. However, to reduce UE manufacturing costs and support a small form factor, a UE 120 may not have enough antennas to dedicate (e.g., orthogonalize) each antenna to only the LTE RAT or to only the NR RAT. As a result, UE 120 may need to share antennas between the LTE RAT and the NR RAT, such that a particular antenna is used for the LTE RAT at one time and for the NR RAT at another time. This antenna sharing is particularly applicable to multiple-input multiple-output (MIMO) communications, where data is communicated simultaneously on multiple data streams (or MIMO layers), and the multiple data streams are received simultaneously by UE 120 via different antennas (e.g., one data stream per antenna).

When communicating using the NR RAT, a UE 120 may be required and/or configured to transmit SRSs to sound a channel so that a base station 110 can estimate the channel. For example, base station 110 may perform channel estimation based at least in part on one or more SRSs received from UE 120. The NR RAT supports a variety of SRS configurations, such as a "1T4R" configuration in which SRSs are transmitted for four NR antennas (e.g., to sound all four antennas) and a "1T2R" configuration in which SRSs are transmitted for two NR antennas (e.g., to sound two out of four antennas). The NR RAT also supports periodic SRS transmission (e.g., configured in a radio resource control (RRC) message) and aperiodic SRS transmission (e.g., triggered by downlink control information (DCI)).

As shown by reference number 420, UE 120 may include an antenna switching module (ASM). The ASM may include various switches, wires, and/or buses that enable the ASM (and UE 120) to switch an antenna from an LTE receive chain to an NR transmit chain (or from being connected to an LTE receive chain to being open-circuited), and vice versa. A receive chain may include a set of components (e.g., a demodulator, a de-interleaver, a MIMO detector, an analog-to-digital converter, and/or a receive processor) that enable UE 120 to process received communications (e.g., from an analog form to a digital form). A transmit chain may include a set of components (e.g., a modulator, an interleaver, a Tx MIMO processor, a digital-to-analog converter, and/or a transmit processor) that enable UE 120 to process communications for transmission (e.g., from a digital form to an analog form).

As shown by reference number 430, in example 400, the ASM switches Ant 3 from being connected to an LTE receive chain (shown as LTE Rx3) to an NR transmit chain (shown as NR Tx). In example 400, the ASM switches Ant 3 to the NR transmit chain to sound Ant 3 (e.g., to transmit one or more SRSs using Ant 3). If Ant 3 was being used to receive LTE communications (e.g., was active for LTE downlink communications), then this antenna switching of Ant 3 degrades LTE performance (e.g., degrades performance of downlink communications on the LTE RAT). For example, UE 120 may fail to receive one or more downlink communications and/or a portion of a downlink communication (e.g., in one or more time domain resources, such as one or more symbols) of the LTE RAT. In some examples (e.g., for a sub-carrier spacing of 30 kilohertz), SRS antenna switching for NR SRS transmission may interrupt one or two downlink symbols of the LTE RAT. This may negatively impact downlink performance of the LTE RAT, such as by reducing throughput and/or by introducing communication errors.

As indicated above, FIG. 4 is provided as an example. Other examples may differ from what is described with respect to FIG. 4.

Figure 5:
FIG. 5 is a diagram illustrating an example of an impact table that corresponds to an antenna resource configuration, in accordance with various aspects of the present disclosure.

FIG. 5 is a diagram illustrating an example 500 of an impact table that corresponds to an antenna resource configuration, in accordance with various aspects of the present disclosure.

Many UEs are configured to support 1T4R SRS antenna switching on NR with shared antenna designs with LTE for ENDC operation. This may include supporting 1T4R on NR in B3+N41 and B39+41 ENDC frequency band combinations in 4/5 antenna designs. However, there may be conflicts between LTE and NR concurrent operation on certain antenna ports due to the sharing of physical antennas or ASMs (cross switches). For example, a UE may receive a downlink reference signal, such as a CRS that is used in LTE for cell search and initial acquisition. The antenna used to receive the LTE CRS may conflict with an antenna used by the UE to transmit an NR SRS. A current approach to resolve this conflict is to stop LTE's reception of the LTE CRS on the antenna during transmission of the NR SRS. This may be referred to as "blanking" the LTE's receive antenna. Based on a quantity of antennas and/or a radio frequency card design for the antennas, the blanking on LTE may be on two receive chains for every SRS resource or three receive chains for one or more NR SRS resource occasions. Some LTE blanking may be due to not only a shared antenna but, a shared ASM. For example, if Ant 1 and Ant 3 share an ASM, if transmission on Ant 1 is blanked, transmission on Ant 3 may also be blanked. In some scenarios, LTE blanking may also be for physical downlink shared channel (PDSCH) communications.

Example 500 shows a representative portion of an impact table (Mav or non-Mav) that corresponds to an antenna resource configuration for 1T4R with receive chains (Rx0, Rx1, Rx2, Rx3) and/or a transmit chain (Tx) configured for each of four antennas (Ant 1, Ant 2, Ant 3, Ant 4). The antennas may be scheduled for NR SRS selection or with LTE antenna switching diversity for receiving CRSs or PDSCH communications. Each table entry shows receive chains and/or a transmit chain that are to be blanked according to the selected antennas. For example, NR SRS transmission on Ant 3 may cause receive chains 1, 2, and 3 (Rx123) to be blanked if an LTE CRS is to be received on Ant 1. The portion of the impact table shown in example 500 is representative of other entries in the impact table (not shown).

LTE blanking may lead to a periodic block error rate (BLER) on an LTE bearer that may degrade overall UE performance. Degraded communications may cause the UE to waste processing resources and signaling resources. The UE may recover, in some scenarios, from LTE blanking by zeroing out traffic density information corresponding to impacted symbols. However, if an LTE receive chain is blanked during a CRS and/or PDSCH time schedule, performance may not recover.

A UE may have information for both an LTE CRS reception schedule and an NR SRS transmission schedule (e.g., periodicity and offset of SRS antenna resources). The UE may also have information about a relative frame-slot timing between LTE and NR when operating in an ENDC mode. According to some aspects described herein, a UE may minimize the impact on LTE performance that is due to periodic LTE blanking. In some aspects, the UE may select an antenna for transmitting an NR SRS such that antenna resource conflicts with receiving an LTE CRS are minimized based at least in part on an antenna resource configuration. For example, the UE may determine, from the antenna resource configuration, which LTE CRS is to overlap with an SRS resource and thus is to be blanked. If there are four SRS resources (e.g., slot, symbol), each SRS resource is mapped to one of four antennas. The UE may map a particular SRS resource to a physical antenna for which a least number of LTE receive chains are to be LTE blanked due to the conflict with the LTE CRS. The antenna resource configuration may also indicate conflicts that are due to shared ASMs.

The table entries in example 500 are representative of LTE receive chains and/or transmit chains that are to be blanked according to the antenna resource configuration. By selecting an antenna that minimizes antenna resource conflicts between NR SRS and LTE CRS (e.g., least number of blanked LTE receive chains), the UE may lessen the impact of SRS transmission on LTE CRS reception and thus LTE performance may avoid serious degradation. For example, the UE may select Ant 2 for transmission of NR SRS resource if LTE CRS is to be received on Ant 1 during the same (or a nearby) time resource. Selection of Ant 2 would lead to the least number of impacted receive/transmit chains (e.g., no receive or transmit chains are impacted). As a result, performance of LTE downlink communications in an ENDC mode is improved by increasing throughput and/or reducing communication errors that waste processing resources and signaling resources.

As indicated above, FIG. 5 is provided as an example. Other examples may differ from what is described with regard to FIG. 5.

Figure 6:
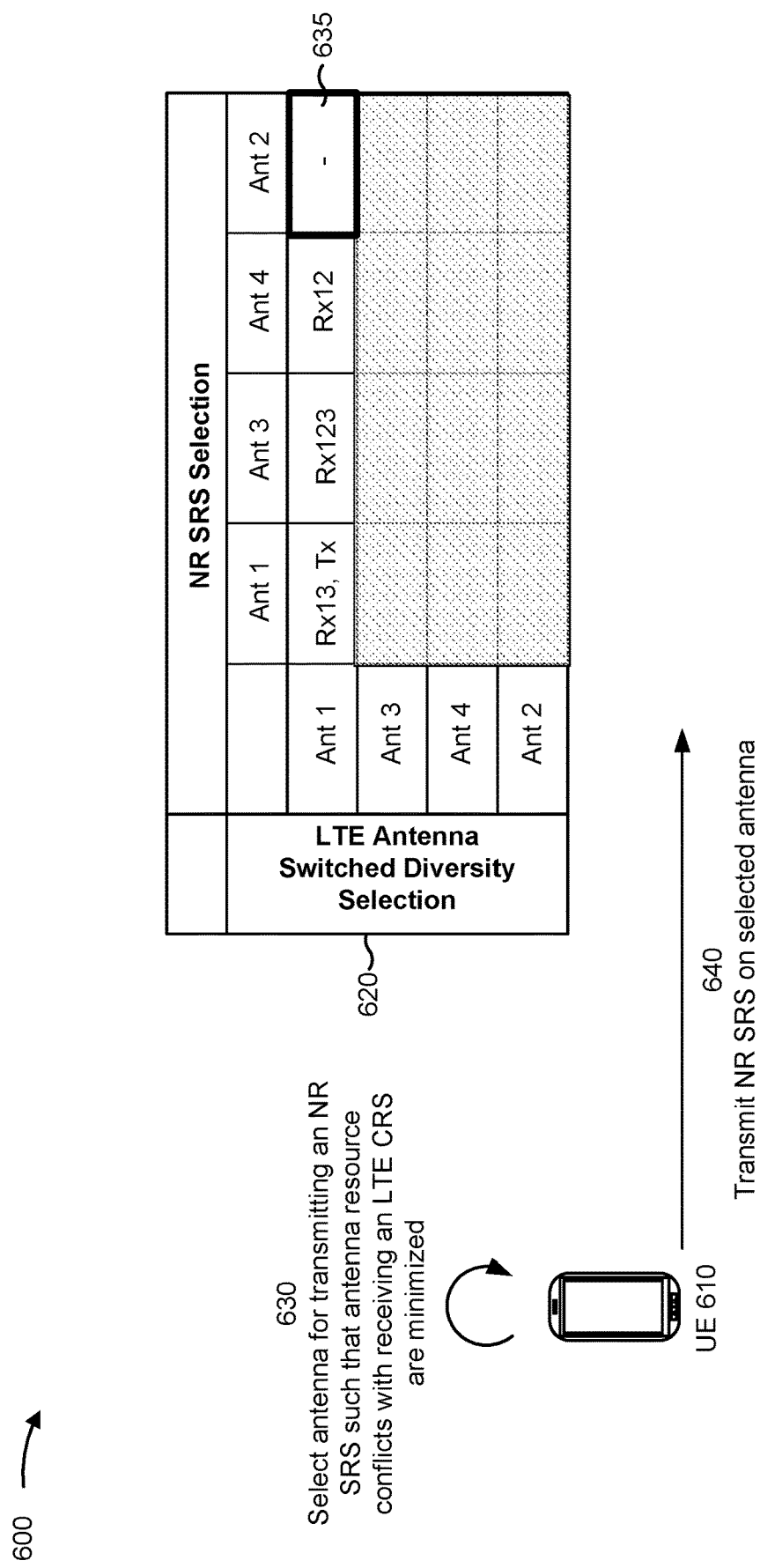
FIG. 6 is a diagram illustrating an example of selecting antennas for SRS antenna switching, in accordance with various aspects of the present disclosure.

FIG. 6 is a diagram illustrating an example 600 of selecting antennas for SRS antenna switching, in accordance with various aspects of the present disclosure. Example 600 shows a UE 610 (e.g., UE 120 depicted in FIGS. 1-2) that may perform antenna switching in a dual connectivity mode (e.g., ENDC or another dual connectivity mode). UE 610 may have information about an antenna resource configuration. The information may inform UE 610 about which LTE CRS antennas are impacted (e.g., blanked) by NR SRS antennas, as illustrated by table 620.

UE 610 may perform blanking of one or more samples received in one or more symbols (e.g., and via the one or more antennas) identified by UE 610 as being impacted by antenna switching. For example, UE 610 may blank one or more samples received via an impacted antenna and in an impacted symbol. In some aspects, blanking a sample may include zeroing out the sample, dropping the sample, disregarding the sample, discarding the sample, or refraining from using the sample to interpret a signal received (e.g., in the symbol). UE 610 may perform this blanking using a digital component of UE 610 (e.g., a digital baseband component) and/or an analog component of UE 610 (e.g., an analog radio frequency component). In some aspects, UE 610 may perform blanking regardless of whether the impacted symbol is a data symbol (e.g., that carries data on a data channel, such as a PDSCH) or a CRS symbol (e.g., that carries a CRS). By blanking samples in symbols impacted by antenna switching, UE 610 may avoid inaccuracies associated with those samples (e.g., due to a downlink communication not being received during the impacted symbols), thereby mitigating downlink performance degradation.

In some aspects, UE 610 may perform the antenna switching to transmit an uplink reference signal, such as an SRS in NR. UE 610 may blank CRS reception in LTE on any antennas that conflict with SRS transmission. Table 620 shows representative entries that indicate which LTE receive/transmit chains are to be blanked due to a conflict, according to an antenna resource configuration. To minimize the impact on LTE, UE 610 may use the antenna resource configuration to select an antenna that would minimize the impact on LTE, as shown by reference number 630. This may include selecting an antenna for SRS transmission that would cause a least number of LTE receive chains to be blanked. Note that antenna selection may have multiple options with a same least number of LTE receive/transmit chains that are blanked. In table 620, entry 635 shows that no LTE receive/transmit chains are to be blanked if Ant 1 is used to receive LTE CRS and Ant 2 is used for NR SRS transmission. By contrast, selection of Ant 1 for NR SRS transmission would blank two LTE receive chains and an LTE transmit chain (R13, Tx). Selection of Ant 2 may include using an ASM to switch Ant 2 from an LTE receive chain to an NR transmit chain, similar to as shown in FIG. 4. As shown by reference number 640, the UE may transmit an NR SRS in one or more symbols using the selected antenna.

As indicated above, FIG. 6 is provided as an example. Other examples may differ from what is described with respect to FIG. 6.

Figure 7:
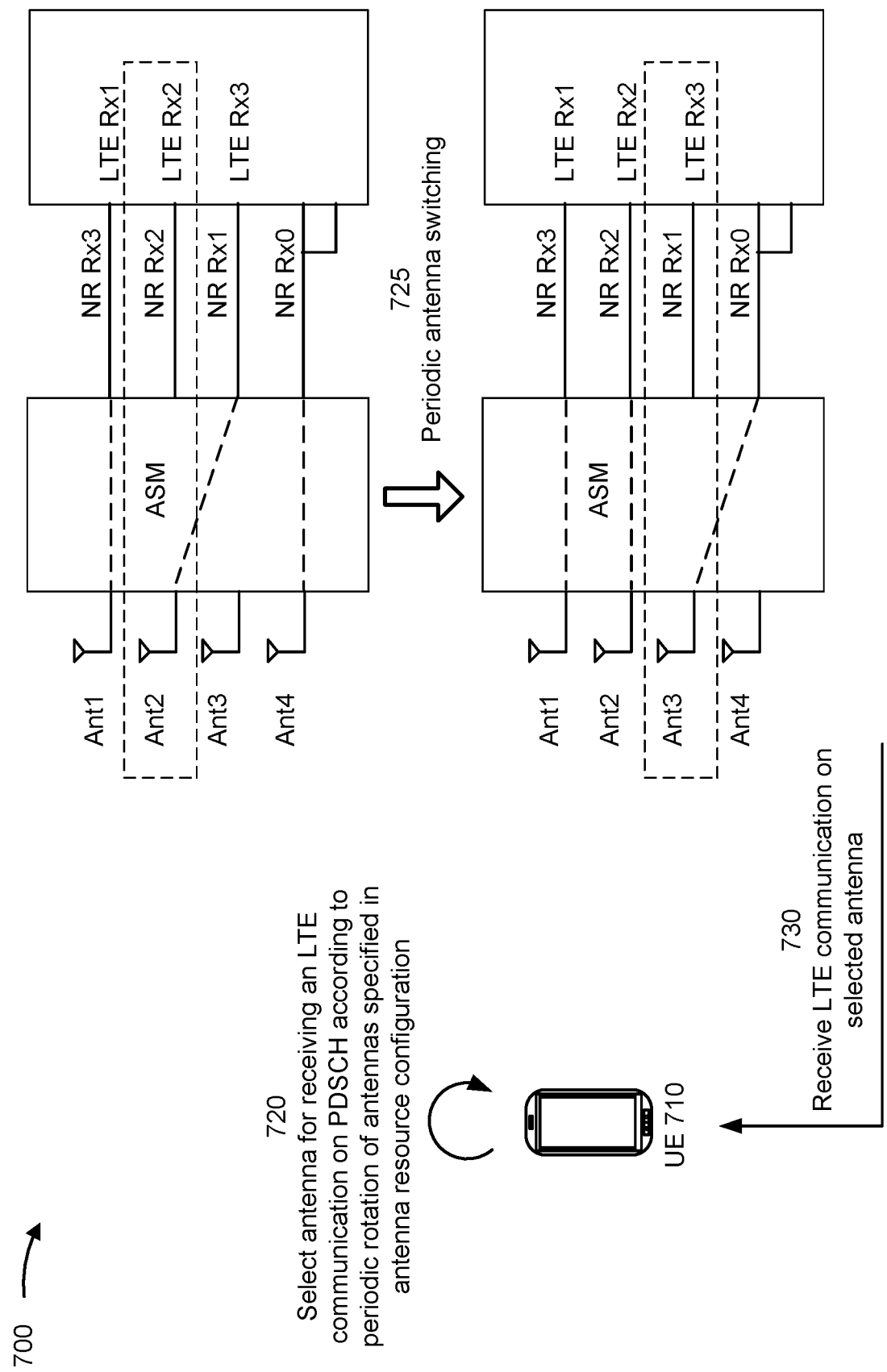
FIG. 7 is a diagram illustrating an example of selecting antennas, in accordance with various aspects of the present disclosure.

FIG. 7 is a diagram illustrating an example 700 of selecting antennas, in accordance with various aspects of the present disclosure. Example 700 shows a UE 710 (e.g., UE 120 depicted in FIGS. 1-2) that may perform antenna switching in a dual connectivity mode (e.g., ENDC or another dual connectivity mode).

LTE blanking may involve other issues. For example, repeated LTE blanking on specific symbols or subframes due to NR SRS transmission may have a severe impact on link adaptation. This may degrade LTE communications on a PDSCH when NR SRS transmission is involved. Furthermore, if particular resources (e.g., symbols, subframes) are severely impacted, the UE may lower a modulation and coding scheme used for the LTE communications. This may severely reduce throughput.

According to some aspects described herein, a UE may more evenly distribute LTE blanking across antennas and/or resources. If the UE has information about an antenna resource configuration and NR SRS scheduling, UE 710 may select an antenna for receiving LTE communications on the PDSCH according to a periodic rotation of antennas, as shown by reference number 720. UE 710 may determine the periodic rotation for switching antennas based at least in part on the antenna resource configuration. UE 710 may select the antenna for receiving one or more LTE communications according to an antenna switch for a particular scheduled resource. As shown by reference number 725, UE 710 may enable antenna switched diversity to allow an LTE receive chain to be switched to multiple antennas as part of the periodic rotation of antennas. There may be different rotations based at least in part on different antenna resource configurations.

In some aspects, UE 710 may select the antenna according to a periodic rotation of antennas if a signal quality, such as an LTE signal-to-noise ratio (SNR), satisfies a certain SNR threshold. For example, an SNR for a certain receive chain may drop below the SNR threshold. In some aspects, UE 710 may select the antenna according to the periodic rotation of antennas based at least in part on an amount of NR SRS transmissions (e.g., percentage) with respect to overall data transmission. Selection by rotation of antennas may be based at least in part on how much LTE blanking is occurring for particular resources.

Some UEs may have 5/6 antenna designs, and transmission of NR SRSs on different antennas may involve LTE blanking of one, two, or three receive chains. In many designs, two receive chains may get blanked for LTE during every SRS transmission from NR. In some aspects, if two or more receive chains are getting LTE blanked due to antenna resource conflicts, UE 710 may map reception layers to antennas such that antennas that conflict with receiving LTE communication on the PDSCH do not belong to the same layer. This may include identifying two antennas that conflict with NR SRS transmission when receiving the LTE communications on the PDSCH, and mapping two separate antennas to different layers of LTE for receiving the LTE communications. This may avoid situations where disproportionate LTE blanking may cause the network, according to network scheduling behavior, to reduce a rank or number of layers on LTE that would lead to a severe reduction in throughput.

As shown by reference number 730, UE 710 may receive the LTE communications using the selected antenna. As a result, any impact due to LTE blanking may be reduced so as not to severely impact a particular receive chain or transmit chain. BLER may be distributed better and link adaptation, such as outer loop link adaptation, may not suffer. The aspects described herein also involve less complexity than other possible solutions for reducing the impact of LTE blanking. The aspects described herein may also involve no changes to an NR timeline.

As indicated above, FIG. 7 is provided as an example. Other examples may differ from what is described with regard to FIG. 7.

Figure 8:
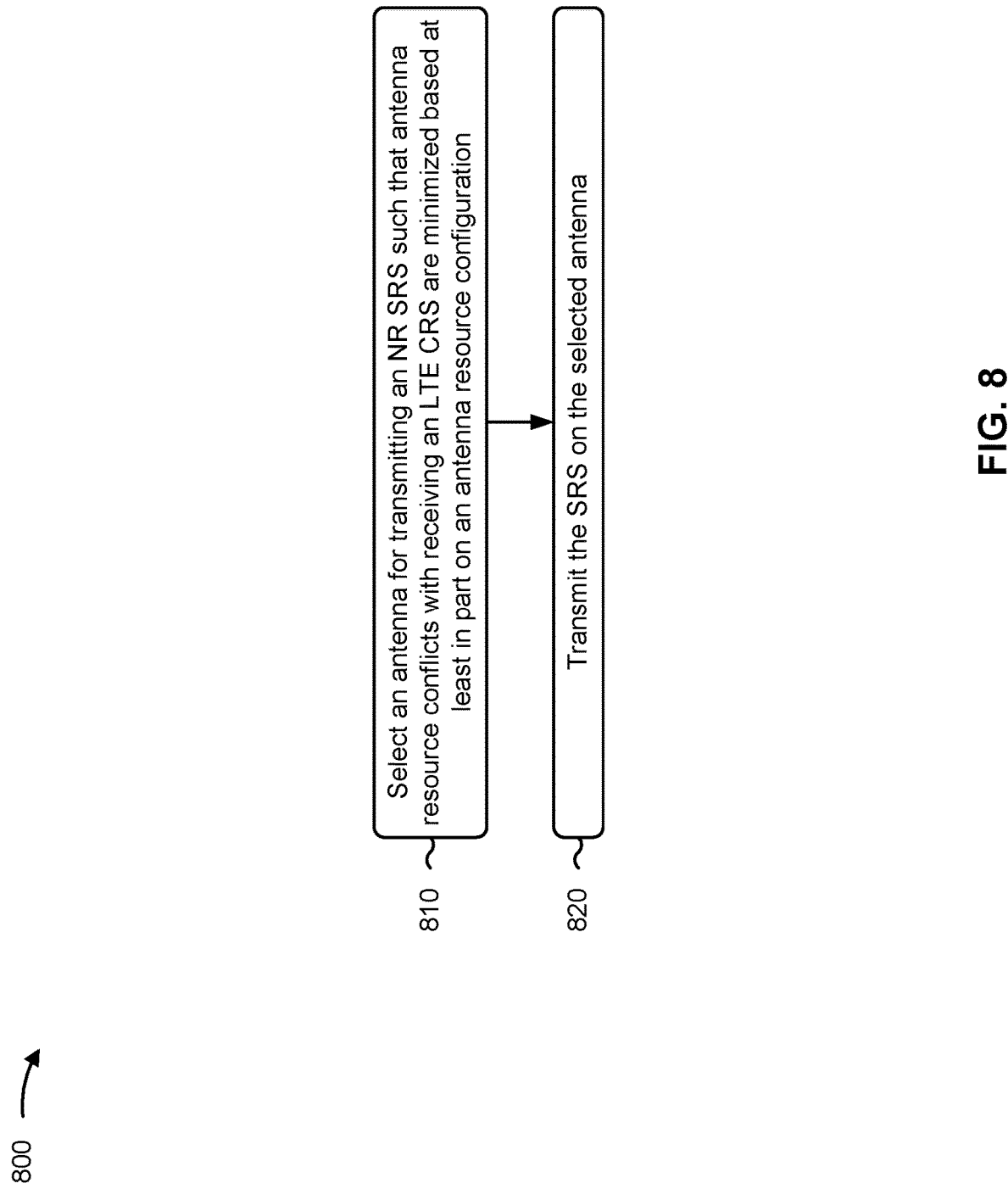
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 depicted in FIGS. 1-3, UE 610 depicted in FIG. 6) performs operations associated with antenna selection SRS antenna switching.

As shown in FIG. 8, in some aspects, process 800 may include selecting an antenna for transmitting an NR SRS such that antenna resource conflicts with receiving an LTE CRS are minimized based at least in part on an antenna resource configuration (block 810). For example, the UE (e.g., using selection component 1008 depicted in FIG. 10) may select an antenna for transmitting an NR SRS such that antenna resource conflicts with receiving an LTE CRS are minimized based at least in part on an antenna resource configuration, as described above in connection with FIGS. 3-6.

As further shown in FIG. 8, in some aspects, process 800 may include transmitting the SRS on the selected antenna (block 820). For example, the UE (e.g., using transmission component 1004 depicted in FIG. 10) may transmit the SRS on the selected antenna, as described above in connection with FIGS. 3-6.

Process 800 may include additional aspects, such as any single aspect or any combination of aspects described below and/or in connection with one or more other processes described elsewhere herein.

In a first aspect, selecting the antenna includes selecting, from among antennas specified in the antenna resource configuration, an antenna that causes a minimum quantity of antenna resource conflicts with receiving the CRS.

In a second aspect, alone or in combination with the first aspect, selecting the antenna includes selecting the antenna while operating in ENDC mode.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
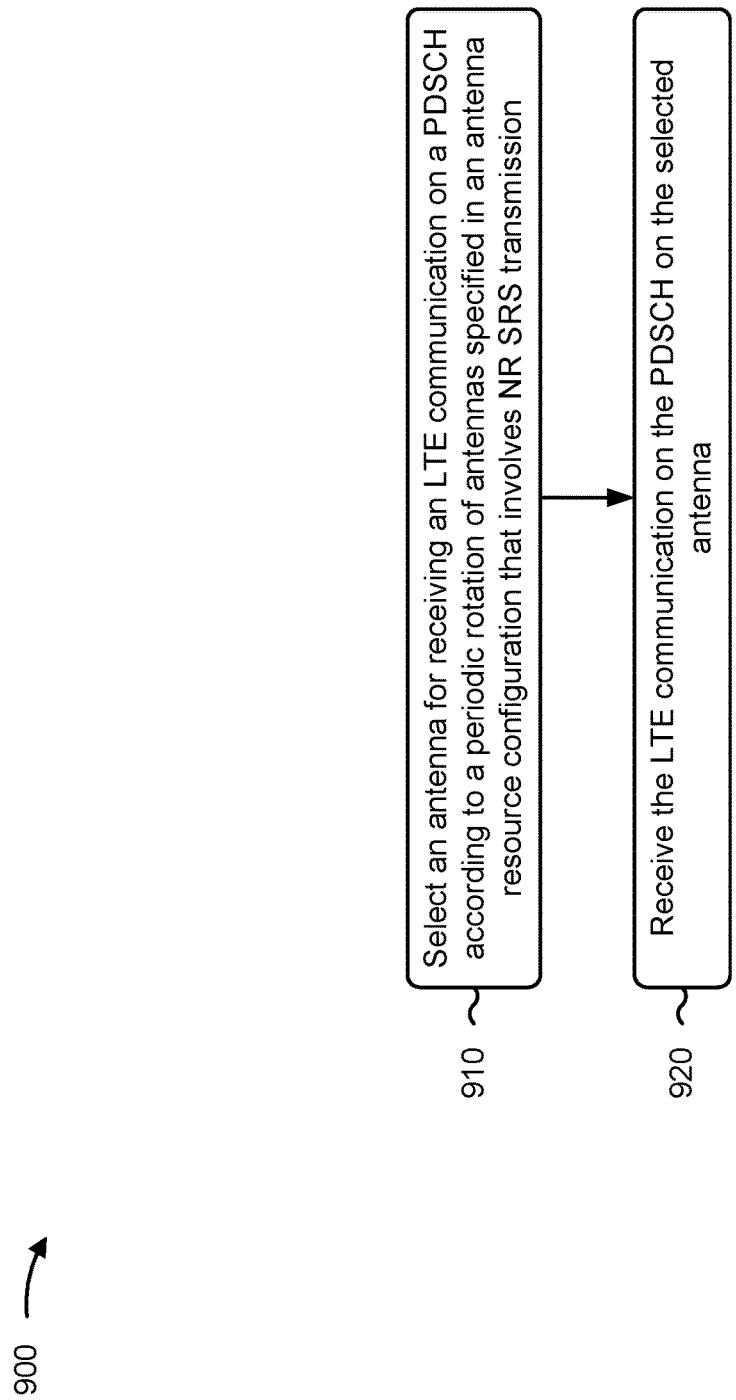
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 depicted in FIGS. 1-3, UE 710 depicted in FIG. 7) performs operations associated with selecting antennas for SRS antenna switching.

As shown in FIG. 9, in some aspects, process 900 may include selecting an antenna for receiving an LTE communication on a PDSCH according to a periodic rotation of antennas specified in an antenna resource configuration that involves NR SRS transmission (block 910). For example, the UE (e.g., using selection component 1108 depicted in FIG. 11) may select an antenna for receiving an LTE communication on a PDSCH according to a periodic rotation of antennas specified in an antenna resource configuration that involves NR SRS transmission, as described above as described above in connection with FIGS. 3-5 and 7.

As further shown in FIG. 9, in some aspects, process 900 may include receiving the LTE communication on the PDSCH on the selected antenna (block 920). For example, the UE (e.g., using reception component 1102 depicted in FIG. 11) may receive the LTE communication on the PDSCH on the selected antenna, as described above in connection with FIGS. 3-5 and 7.

Process 900 may include additional aspects, such as any single aspect or any combination of aspects described below and/or in connection with one or more other processes described elsewhere herein.

In a first aspect, the selecting of the antenna according to the periodic rotation is based at least in part on an amount of NR SRS transmission, with respect to overall data transmission, satisfying a threshold.

In a second aspect, alone or in combination with the first aspect, the selecting of the antenna according to the periodic rotation is based at least in part on a determination that two or more receive chains of the antenna resource configuration have antenna resource conflicts with receiving the LTE communication on the PDSCH.

In a third aspect, alone or in combination with one or more of the first and second aspects, the selecting of the antenna according to the periodic rotation is based at least in part in antenna switching diversity.

In a fourth aspect, alone or in combination with one or more of the first through third aspects, process 900 includes mapping layers to antennas such that antennas that conflict with receiving the LTE communication on the PDSCH do not belong to a same layer.

In a fifth aspect, alone or in combination with one or more of the first through fourth aspects, mapping the layers includes identifying two separate antennas that both conflict with receiving the LTE communication on the PDSCH, and mapping the two separate antennas to different layers of LTE.

In a sixth aspect, alone or in combination with one or more of the first through fifth aspects, selecting the antenna includes selecting the antenna while operating in ENDC mode.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
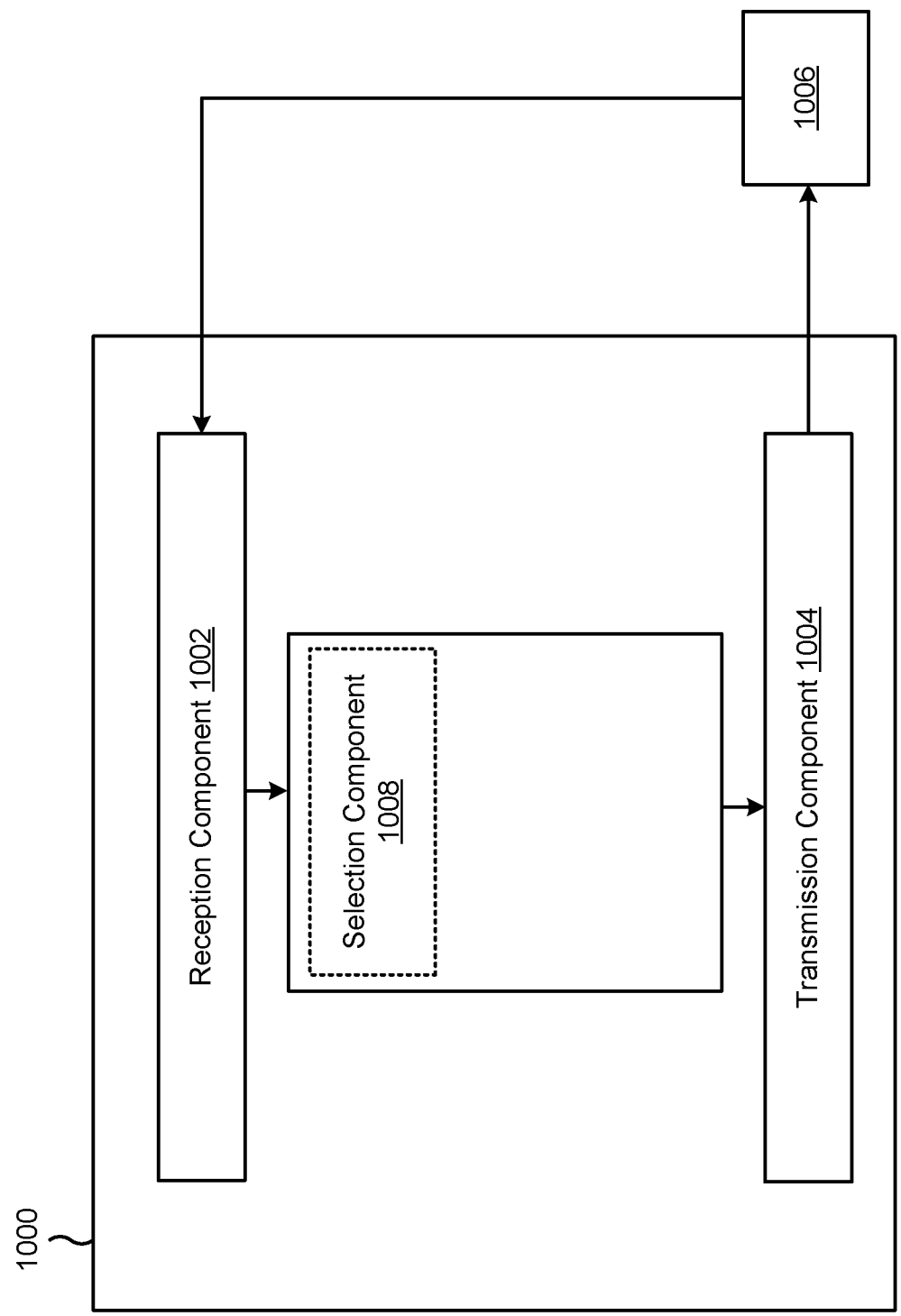

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a selection component 1008, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The selection component 1008 may select an antenna for transmitting an NR SRS such that antenna resource conflicts with receiving an LTE CRS are minimized based at least in part on an antenna resource configuration. The transmission component 1004 may transmit the SRS on the selected antenna.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a selection component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The selection component 1108 may select an antenna for receiving an LTE communication on a PDSCH according to a periodic rotation of antennas specified in an antenna resource configuration that involves NR SRS transmission. The reception component 1102 may receive the LTE communication on the PDSCH on the selected antenna.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some aspects of the present disclosure:

Aspect 1: A method of wireless communication performed by a user equipment (UE), comprising: selecting an antenna for transmitting a New Radio (NR) sounding reference signal (SRS) such that antenna resource conflicts with receiving a Long Term Evolution (LTE) cell-specific reference signal (CRS) are minimized based at least in part on an antenna resource configuration; and transmitting the SRS on the selected antenna.

Aspect 2: The method of aspect 1, wherein selecting the antenna includes selecting, from among antennas specified in the antenna resource configuration, an antenna that causes a minimum quantity of antenna resource conflicts with receiving the CRS.

Aspect 3: The method of aspect 1 or 2, wherein selecting the antenna includes selecting the antenna while operating in a New Radio dual connectivity mode in an evolved universal terrestrial access network.

Aspect 4: A method of wireless communication performed by a user equipment (UE), comprising: selecting an antenna for receiving a Long Term Evolution (LTE) communication on a physical downlink shared channel (PDSCH) according to a periodic rotation of antennas specified in an antenna resource configuration that involves New Radio (NR) sounding reference signal (SRS) transmission; and receiving the LTE communication on the PDSCH on the selected antenna.

Aspect 5: The method of aspect 4, wherein the selecting of the antenna according to the periodic rotation is based at least in part on an amount of NR SRS transmission, with respect to overall data transmission, satisfying a threshold.

Aspect 6: The method of aspect 4 or 5, wherein the selecting of the antenna according to the periodic rotation is based at least in part on a determination that two or more receive chains of the antenna resource configuration have antenna resource conflicts with receiving the LTE communication on the PDSCH.

Aspect 7: The method of any of aspects 4-6, wherein the selecting of the antenna according to the periodic rotation is based at least in part in antenna switching diversity.

Aspect 8: The method of any of aspects 4-7, further comprising mapping layers to antennas such that antennas that conflict with receiving the LTE communication on the PDSCH do not belong to a same layer.

Aspect 9: The method of aspect 8, wherein mapping the layers includes: identifying two separate antennas that both conflict with receiving the LTE communication on the PDSCH; and mapping the two separate antennas to different layers of LTE.

Aspect 10: The method of any of aspects 4-9, wherein selecting the antenna includes selecting the antenna while operating in a New Radio dual connectivity mode in an evolved universal terrestrial access network.

Aspect 11: An apparatus for wireless communication at a device, comprising a processor; memory coupled with the processor; and instructions stored in the memory and executable by the processor to cause the apparatus to perform the method of one or more aspects of aspects 1-10.

Aspect 12: A device for wireless communication, comprising a memory and one or more processors coupled to the memory, the memory and the one or more processors configured to perform the method of one or more aspects of aspects 1-10.

Aspect 13: An apparatus for wireless communication, comprising at least one means for performing the method of one or more aspects of aspects 1-10.

Aspect 14: A non-transitory computer-readable medium storing code for wireless communication, the code comprising instructions executable by a processor to perform the method of one or more aspects of aspects 1-10.

Aspect 15: A non-transitory computer-readable medium storing a set of instructions for wireless communication, the set of instructions comprising one or more instructions that, when executed by one or more processors of a device, cause the device to perform the method of one or more aspects of aspects 1-10.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed at a user equipment (UE), comprising:
   selecting, from among antennas specified in an antenna resource configuration of the UE, an antenna associated with a least number of one or more Long Term Evolution (LTE) receive chains being blanked if the selected antenna is used for transmission of a New Radio (NR) sounding reference signal (SRS); and
   transmitting the NR SRS on the selected antenna.

2. The method of claim 1, wherein the antenna is selected based on at least one of a NR SRS transmission schedule or an LTE CRS reception schedule.

3. The method of claim 1, wherein selecting the antenna comprises selecting the antenna while operating in a NR dual connectivity mode in an evolved universal terrestrial radio access network.

4. A method of wireless communication performed at a user equipment (UE), comprising:
   selecting an antenna for receiving a Long Term Evolution (LTE) communication on a physical downlink shared channel (PDSCH) according to a periodic rotation of antennas specified in an antenna resource configuration that involves New Radio (NR) sounding reference signal (SRS) transmission,
      wherein the periodic rotation is configured based on the antenna resource configuration; and
   receiving the LTE communication on the PDSCH via the selected antenna.

5. The method of claim 4, wherein the selection of the antenna according to the periodic rotation is based at least in part on an amount of NR SRS transmission, with respect to overall data transmission, satisfying a threshold.

6. The method of claim 4, wherein the selection of the antenna according to the periodic rotation is based at least in part on when two or more receive chains of the antenna resource configuration have antenna resource conflicts with receiving the LTE communication on the PDSCH.

7. The method of claim 4, wherein the selection of the antenna according to the periodic rotation is based at least in part on antenna switching diversity.

8. The method of claim 4, further comprising mapping layers to antennas such that antennas that conflict with receiving the LTE communication on the PDSCH do not belong to a same layer.

9. The method of claim 8, wherein mapping the layers includes:
identifying two separate antennas that both conflict with receiving the LTE communication on the PDSCH; and
mapping the two separate antennas to different layers of LTE.

10. The method of claim 4, wherein selecting the antenna includes selecting the antenna while operating in a NR dual connectivity mode in an evolved universal terrestrial access network.

11. A user equipment (UE), comprising:
a memory comprising instructions;
one or more processors configured to execute the instructions and cause the UE to:
select, from among antennas specified in an antenna resource configuration of the UE, an antenna associated with a least number of one or more Long Term Evolution (LTE) receive chains being blanked if the selected antenna is used for transmission of a New Radio (NR) sounding reference signal (SRS); and
a transceiver configured to transmit the NR SRS on the selected antenna.

12. The UE of claim 11, wherein the one or more processors, when selecting the antenna, are configured to select the antenna while operating in a NR dual connectivity mode in an evolved universal terrestrial radio access network.

13. The UE of claim 11, wherein the antenna is selected based on at least one of a NR SRS transmission schedule or an LTE CRS reception schedule.

14. A user equipment (UE), comprising:
a memory comprising instructions;
one or more processors configured to execute the instructions and cause the UE to:
select an antenna for receiving a Long Term Evolution (LTE) communication on a physical downlink shared channel (PDSCH) according to a periodic rotation of antennas specified in an antenna resource configuration that involves New Radio (NR) sounding reference signal (SRS) transmission,
wherein the periodic rotation is configured based on the antenna resource configuration; and
a transceiver configured to receive the LTE communication on the PDSCH via the selected antenna.

15. The UE of claim 14, wherein the one or more processors are configured to select the antenna according to the periodic rotation based at least in part on an amount of SRS, with respect to overall data transmission, satisfying a threshold.

16. The UE of claim 14, wherein the one or more processors are configured to select the antenna according to the periodic rotation based at least in part on when two or more receive chains of the antenna resource configuration have antenna resource conflicts with receiving the LTE communication on the PDSCH.

17. The UE of claim 14, wherein the one or more processors are configured to select the antenna according to the periodic rotation based at least in part in antenna switching diversity.

18. The UE of claim 14, wherein the one or more processors are further configured to cause the UE to map layers to antennas such that antennas that conflict with receiving the LTE communication on the PDSCH do not belong to a same layer.

19. The UE of claim 18, wherein the one or more processors, when mapping the layers, are configured to:
identify two separate antennas that both conflict with receiving the LTE communication on the PDSCH; and
map the two separate antennas to different.

20. The UE of claim 14, wherein the one or more processors, when selecting the antenna, are configured to select the antenna while operating in a NR dual connectivity mode in an evolved universal terrestrial access network.

* * * * *